United States Patent
Yamamoto et al.

(10) Patent No.: US 10,500,527 B2
(45) Date of Patent: Dec. 10, 2019

(54) BALLAST WATER PRODUCTION METHOD AND BALLAST WATER TREATMENT SYSTEM

(71) Applicant: KURARAY CO., LTD., Kurashiki-shi (JP)

(72) Inventors: Mitsuaki Yamamoto, Osaka (JP); Kazuaki Hagiwara, Okayama (JP); Yasuhiro Tajima, Osaka (JP)

(73) Assignee: KURARAY CO., LTD., Kurashiki-shi (JP)

( * ) Notice: Subject to any disclaimer, the term of this patent is extended or adjusted under 35 U.S.C. 154(b) by 162 days.

(21) Appl. No.: 15/555,226

(22) PCT Filed: Feb. 3, 2016

(86) PCT No.: PCT/JP2016/053288
§ 371 (c)(1),
(2) Date: Sep. 1, 2017

(87) PCT Pub. No.: WO2016/140009
PCT Pub. Date: Sep. 9, 2016

(65) Prior Publication Data
US 2018/0050290 A1    Feb. 22, 2018

(30) Foreign Application Priority Data
Mar. 4, 2015  (JP) .................. 2015-041925

(51) Int. Cl.
*B01D 29/66* (2006.01)
*B01D 29/11* (2006.01)
(Continued)

(52) U.S. Cl.
CPC ............. *B01D 29/66* (2013.01); *B01D 29/11* (2013.01); *B01D 29/216* (2013.01); *B01D 29/52* (2013.01);
(Continued)

(58) Field of Classification Search
CPC ...... B01D 29/66; B01D 29/216; B01D 29/52; B01D 29/11; B01D 29/606; B01D 35/12;
(Continued)

(56) References Cited

U.S. PATENT DOCUMENTS 4,269,707 A    5/1981  Butterworth et al.
2004/0217053 A1  11/2004  Zha et al.
(Continued)

FOREIGN PATENT DOCUMENTS

DE   20 2004 002 616 U1   6/2004
JP        63-240905 A    10/1988
(Continued)

OTHER PUBLICATIONS

English translation of Japanese Patent Application No. 2009-112908 A (2009).*
(Continued)

*Primary Examiner* — John Kim
(74) *Attorney, Agent, or Firm* — Oblon, McClelland, Maier & Neustadt, L.L.P.

(57) ABSTRACT

A ballast water production method is provided. The method includes a filtering step that passes raw water supplied into a housing through a filter from a primary side that is upstream of the filter to a secondary side that is downstream of the filter; a volume-increasing step after the filtering step that increases a volume of water present in a space on the secondary side of the housing while the supply of the raw water into the housing is stopped; a pressurizing step after the volume-increasing step that pressurizes an inside of the housing from the secondary side while the supply of the raw water into the housing is stopped; and a rinsing step after the pressurizing step that passes a fluid through the filter from the secondary side to the primary side while the supply of the raw water into the housing is stopped.

6 Claims, 12 Drawing Sheets

| STEP | TIME (SECOND) | V1 | V2 | V3 | V4 |
|---|---|---|---|---|---|
| FILTERING STEP | 240 | OPEN | OPEN | | |
| VOLUME-INCREASING STEP | 3 | | OPEN | | |
| PRESSURIZING STEP 1 | 3 | | | | OPEN |
| RINSING STEP 1 | 10 | | | OPEN | OPEN |
| DRAINING STEP 1 | 10 | | | OPEN | |
| PRESSURIZING STEP 2 | 3 | | | | OPEN |
| RINSING STEP 2 | 10 | | | OPEN | OPEN |
| DRAINING STEP 2 | 10 | | | OPEN | |
| FILTERING STEP | 240 | OPEN | OPEN | | |

(51) Int. Cl.
*B01D 29/60* (2006.01)
*B63J 4/00* (2006.01)
*C01F 1/00* (2006.01)
*B01D 29/52* (2006.01)
*B01D 35/12* (2006.01)
*B01D 65/02* (2006.01)
*B63B 13/00* (2006.01)
*C02F 1/00* (2006.01)
*B01D 35/027* (2006.01)
*B01D 29/21* (2006.01)
*C02F 103/00* (2006.01)

(52) U.S. Cl.
CPC ....... *B01D 29/606* (2013.01); *B01D 35/0273* (2013.01); *B01D 35/12* (2013.01); *B01D 65/02* (2013.01); *B63B 13/00* (2013.01); *B63J 4/002* (2013.01); *C02F 1/00* (2013.01); *C02F 1/004* (2013.01); *B01D 2201/182* (2013.01); *B01D 2201/54* (2013.01); *C02F 2103/008* (2013.01); *C02F 2201/005* (2013.01); *C02F 2209/03* (2013.01); *C02F 2303/16* (2013.01)

(58) Field of Classification Search
CPC ............... B01D 35/0273; B01D 65/02; B01D 2201/54; B01D 2201/182; C02F 1/004; C02F 1/00; C02F 2103/008; C02F 2209/03; C02F 2303/16; C02F 2201/005; B63J 4/002; B63B 13/00
See application file for complete search history.

(56) References Cited

U.S. PATENT DOCUMENTS

| 2009/0223895 | A1 | 9/2009 | Zha et al. |
| 2011/0309038 | A1 | 12/2011 | Inoue |
| 2015/0336651 | A1 | 11/2015 | Harada et al. |

FOREIGN PATENT DOCUMENTS

| JP | 2004-536710 A | 12/2004 |
| JP | 2009-112908 A | 5/2009 |
| JP | 2010-207795 A | 9/2010 |
| WO | 2010/093025 A1 | 8/2010 |
| WO | 2010/093026 A1 | 8/2010 |
| WO | WO 2013/099106 A1 | 7/2013 |
| WO | 2014/103854 A1 | 7/2014 |

OTHER PUBLICATIONS

English translation of WO 2013/099106 A1 (2013).*
Extended European Search Report dated Sep. 27, 2018 in Patent Application No. 16758704.7.
International Search Report dated Apr. 19, 2016 in PCT/JP2016/053288, filed on Feb. 3, 2016.

* cited by examiner

FIG. 4

| STEP | TIME (SECOND) | V1 | V2 | V3 | V4 |
|---|---|---|---|---|---|
| FILTERING STEP | 300 | OPEN | OPEN | | |
| VOLUME-INCREASING STEP | 3 | | OPEN | | |
| PRESSURIZING STEP | 3 | | | | OPEN |
| RINSING STEP | 10 | | | OPEN | OPEN |
| DRAINING STEP | 10 | | | OPEN | |
| FILTERING STEP | 300 | OPEN | OPEN | | |

FIG. 5

| STEP | TIME (SECOND) | V1 | V2 | V3 | V4 |
|---|---|---|---|---|---|
| FILTERING STEP | 240 | OPEN | OPEN | | |
| VOLUME-INCREASING STEP | 3 | | OPEN | | |
| PRESSURIZING STEP 1 | 3 | | | | OPEN |
| RINSING STEP 1 | 10 | | | OPEN | OPEN |
| DRAINING STEP 1 | 10 | | | OPEN | |
| PRESSURIZING STEP 2 | 3 | | | | OPEN |
| RINSING STEP 2 | 10 | | | OPEN | OPEN |
| DRAINING STEP 2 | 10 | | | OPEN | |
| FILTERING STEP | 240 | OPEN | OPEN | | |

FIG. 6

| STEP | TIME (SECOND) | V1 | V2 | V3 | V4 |
|---|---|---|---|---|---|
| FILTERING STEP | 300 | OPEN | OPEN | | |
| VOLUME-REDUCTION STEP | 10 | | OPEN | OPEN | |
| VOLUME-INCREASING STEP | 5 | | OPEN | | |
| PRESSURIZING STEP | 3 | | | | OPEN |
| RINSING STEP | 10 | | | OPEN | OPEN |
| DRAINING STEP | 10 | | | OPEN | |
| FILTERING STEP | 300 | OPEN | OPEN | | |

FIG. 7

| STEP | TIME (SECOND) | V1 | V2 | V3 | V4 |
|---|---|---|---|---|---|
| FILTERING STEP | 240 | OPEN | OPEN | | |
| VOLUME-INCREASING STEP | 3 | | OPEN | | |
| PRESSURIZING STEP 1 | 3 | | | | OPEN |
| RINSING STEP 1 | 10 | | | OPEN | OPEN |
| VOLUME-REDUCTION STEP | 10 | | OPEN | OPEN | |
| VOLUME-INCREASING STEP | 5 | | OPEN | | |
| PRESSURIZING STEP 2 | 3 | | | | OPEN |
| RINSING STEP 2 | 10 | | | OPEN | OPEN |
| DRAINING STEP | 10 | | | OPEN | |
| FILTERING STEP | 240 | OPEN | OPEN | | |

FIG. 8

| STEP | TIME (SECOND) | V1a | V2a | V3a | V4a | V1b | V2b | V3b | V4b |
|---|---|---|---|---|---|---|---|---|---|
| FILTERING STEP ab | 150 | OPEN | OPEN | | | OPEN | OPEN | | |
| VOLUME-INCREASING STEP a | 10 | | OPEN | | | OPEN | OPEN | | |
| PRESSURIZING STEP a | 3 | | | | OPEN | OPEN | OPEN | | |
| RINSING STEP a | 10 | | | OPEN | OPEN | OPEN | OPEN | | |
| DRAINING STEP a | 10 | | | OPEN | | OPEN | OPEN | | |
| FILTERING STEP ab | 150 | OPEN | OPEN | | | OPEN | OPEN | | |
| VOLUME-INCREASING STEP b | 10 | OPEN | OPEN | | | | OPEN | | |
| PRESSURIZING STEP b | 3 | OPEN | OPEN | | | | | | OPEN |
| RINSING STEP b | 10 | OPEN | OPEN | | | | | OPEN | OPEN |
| DRAINING STEP b | 10 | OPEN | OPEN | | | | | OPEN | |
| FILTERING STEP ab | 150 | OPEN | OPEN | | | OPEN | OPEN | | |

FIG. 9

| STEP | TIME (SECOND) | V1a | V2a | V3a | V4a | V1b | V2b | V3b | V4b |
|---|---|---|---|---|---|---|---|---|---|
| FILTERING STEP ab | 150 | OPEN | OPEN | | | OPEN | OPEN | | |
| VOLUME-REDUCTION STEP a | 10 | | OPEN | OPEN | | OPEN | OPEN | | |
| VOLUME-INCREASING STEP a | 5 | | OPEN | | | OPEN | OPEN | | |
| PRESSURIZING STEP a | 3 | | | | OPEN | OPEN | OPEN | | |
| RINSING STEP a | 10 | | | OPEN | OPEN | OPEN | OPEN | | |
| DRAINING STEP a | 10 | | | OPEN | | OPEN | OPEN | | |
| FILTERING STEP ab | 150 | OPEN | OPEN | | | OPEN | OPEN | | |
| VOLUME-REDUCTION STEP b | 10 | OPEN | OPEN | | | | OPEN | OPEN | |
| VOLUME-INCREASING STEP b | 5 | OPEN | OPEN | | | | OPEN | | |
| PRESSURIZING STEP b | 3 | OPEN | OPEN | | | | | | OPEN |
| RINSING STEP b | 10 | OPEN | OPEN | | | | | OPEN | OPEN |
| DRAINING STEP b | 10 | OPEN | OPEN | | | | | OPEN | |
| FILTERING STEP ab | 150 | OPEN | OPEN | | | OPEN | OPEN | | |

FIG. 10

| STEP | TIME (SECOND) | V1 | V2 | V3 | V4 |
|---|---|---|---|---|---|
| FILTERING STEP | 300 | OPEN | OPEN | | |
| RINSING STEP | 10 | | | OPEN | OPEN |
| DRAINING STEP | 10 | | | OPEN | |
| FILTERING STEP | 300 | OPEN | OPEN | | |

FIG. 11

| STEP | TIME (SECOND) | V1 | V2 | V3 | V4 |
|---|---|---|---|---|---|
| FILTERING STEP | 300 | OPEN | OPEN | | |
| SWITCHING STEP | 5 | OPEN | OPEN | OPEN | |
| RINSING STEP | 10 | | | OPEN | OPEN |
| DRAINING STEP | 10 | | | OPEN | |
| FILTERING STEP | 300 | OPEN | OPEN | | |

FIG. 12

|  | EMBODIMENT | | | | | | REFERENCE EXAMPLE | |
|---|---|---|---|---|---|---|---|---|
|  | 1 | 2 | 3 | 4 | 5 | 6 | 1 | 2 |
| TIME (MINUTE) FOR DIFFERENTIAL PRESSURE TO REACH 100 kPa | 186 | 315 | 284 | 469 | >600 | >600 | 26 | 32 |

BALLAST WATER PRODUCTION METHOD AND BALLAST WATER TREATMENT SYSTEM

CROSS-REFERENCE TO RELATED APPLICATIONS

This application is a National Stage of PCT/JP2016/053288, which was filed on Feb. 3, 2016. This application is based upon and claims the benefit of priority to Japanese Application No. 2015-041925, which was filed on Mar. 4, 2015.

TECHNICAL FIELD

The present invention relates to a ballast water production method of producing ballast water by treating raw water such as seawater, brackish water, fresh water, river water, and lake water to be loaded on a vessel, and a ballast water treatment system.

BACKGROUND ART

For example, when a vessel, in particular, a cargo vessel is not loaded with cargo, measures are taken to stabilize a vessel body by loading a ballast tank provided in the vessel with seawater or the like for lowering the center of gravity of the vessel. Since ballast water is discharged outside a vessel at a port of call when loading cargo, an ocean-going vessel might invite a problem that aquatic life such as marine microbes included in ballast water comes and goes between many countries to adversely affect an ecosystem as introduced species.

In recent years, for solving such a problem of ballast water, ballast water discharge is internationally regulated. As a treatment method meeting the regulation, a ballast water treatment system has been proposed. Steps conducted in the ballast water treatment system include a filtering step of capturing foreign matters such as zooplankton, phytoplankton, and suspended particles included in raw water (seawater), a sterilization step of sterilizing plankton, and the like.

CITATION LIST

Patent Literature

Patent Literature 1: Japanese Laid-open Patent Publication No. 2010-207795
Patent Literature 2: WO 2010/093026

In a ballast water treatment system, when raw water is filtered in a filtering step, foreign matters included in the raw water are captured and removed from the raw water. In such a filtering step, continuous filtering using a filter results in an increase in a water flow resistance because the filter is clogged by foreign matters. In order to avoid such a state where a water flow resistance is increased, the filter is rinsed by periodically conducting a rinsing step of allowing a fluid to flow in a direction opposite to that in the filtering step.

However, in a case where raw water includes a lot of foreign matters such as plankton and suspended particles, such a rinsing step as described above may not satisfactorily recover a water flow resistance in some cases. In this case, since such action, for example, as replacement of a filter is required, operation of a treatment system needs to be interrupted.

SUMMARY OF INVENTION

An object of the present invention is to provide a ballast water production method and a ballast water treatment system that enable a water flow resistance, which is increased by execution of a filtering step, to be effectively recovered to operate a treatment system for a long period of time.

A ballast water production method according to one aspect of the present invention uses a filtering unit having a housing and a filter housed in the housing. The production method of the present invention includes a filtering step, a volume-increasing step, a pressurizing step, and a rinsing step. The filtering step is a step of passing raw water supplied into the housing through the filter from a primary side that is upstream of the filter to a secondary side that is downstream of the filter. The volume-increasing step is a step of, after the filtering step, increasing a volume of water present in a space on the secondary side of the housing while the supply of the raw water into the housing is stopped. The pressurizing step is a step of, after the volume-increasing step, pressurizing an inside of the housing from the secondary side while the supply of the raw water into the housing is stopped. The rinsing step is a step of, after the pressurizing step, passing a fluid through the filter from the secondary side to the primary side while the supply of the raw water into the housing is stopped.

Additionally, the ballast water treatment system of the present invention includes a filtering unit having a filter; a raw water passage for supplying raw water to the filtering unit, the raw water passage being provided with a first switching valve; a filtered water passage for sending filtered water produced in the filtering unit to a ballast tank, the filtered water passage being provided with a second switching valve; a discharge passage for discharging water from the filtering unit, the discharge passage being provided with a third switching valve; a gas passage for supplying gas to the filtering unit, the gas passage being provided with a fourth switching valve; and a controller for controlling the first to fourth switching valves. The controller is configured to, after filtering of the raw water is conducted by the filtering unit and before the filter is rinsed, control the first switching valve, the third switching valve, and the fourth switching valve to be closed and the second switching valve to be opened, and control the first switching valve, the second switching valve, and the third switching valve to be closed and the fourth switching valve to be opened.

BRIEF DESCRIPTION OF DRAWINGS

FIG. 4 is a table showing one example (first embodiment) of steps of a ballast water production method according to the embodiment of the present invention.

FIG. 5 is a table showing another example (second embodiment) of steps of the ballast water production method according to the embodiment.

FIG. 6 is a table showing yet another example (third embodiment) of steps of the ballast water production method according to the embodiment.

FIG. 7 is a table showing still another example (fourth embodiment) of steps of the ballast water production method according to the embodiment.

FIG. 8 is a table showing still another example (fifth embodiment) of steps of the ballast water production method according to the embodiment.

FIG. 9 is a table showing still another example (sixth embodiment) of steps of the ballast water production method according to the embodiment FIG. 10 is a table showing steps of a ballast water production method according to a first reference example.

FIG. 11 is a table showing steps of a ballast water production method according to a second reference example.

FIG. 12 is a table showing an evaluation result of comparison between the first to sixth embodiments and the first and second reference examples.

DESCRIPTION OF EMBODIMENTS

In the following, an embodiment for implementing the present invention will be described in detail with reference to the drawings. A ballast water production method according to an embodiment of the present invention is a method for producing ballast water (filtered water) by treating raw water introduced into a vessel. In the present embodiment, as a system for producing ballast water, for example, a ballast water treatment system 1 shown in FIG. 1 can be used. Ballast water produced using the ballast water treatment system 1 is stored in a ballast tank 7 disposed in a vessel 100. The system used in the ballast water production method is not limited to the ballast water treatment system 1 shown in FIG. 1, but may be a system including a structure different from that of FIG. 1. In the present embodiment, examples of raw water include seawater, brackish water, fresh water, river water, lake water, and the like.

[Ballast Water Treatment System]

Figure 1:
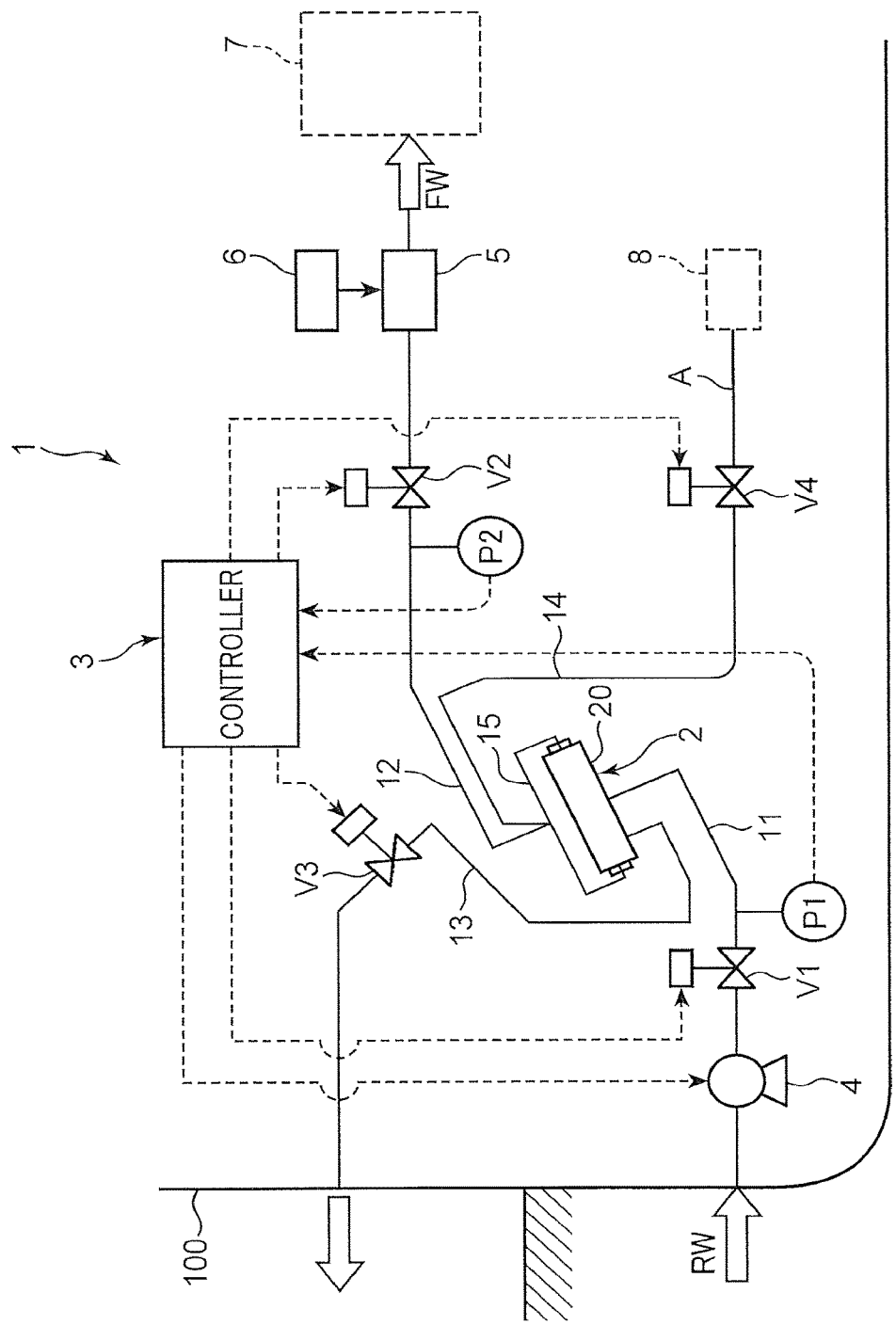
FIG. 1 is a system diagram showing one example of a ballast water treatment system according to an embodiment of the present invention.

As shown in FIG. 1, the ballast water treatment system 1 (ballast water producing apparatus 1) includes a filtering unit 2, a controller 3, a pump 4 (ballast pump 4), a mixer 5, a chemical agent tank 6, a raw water passage 11, a filtered water passage 12, a discharge passage 13, a gas passage 14, switching valves V1 to V4, and pressure sensors P1 and P2.

Figure 2:
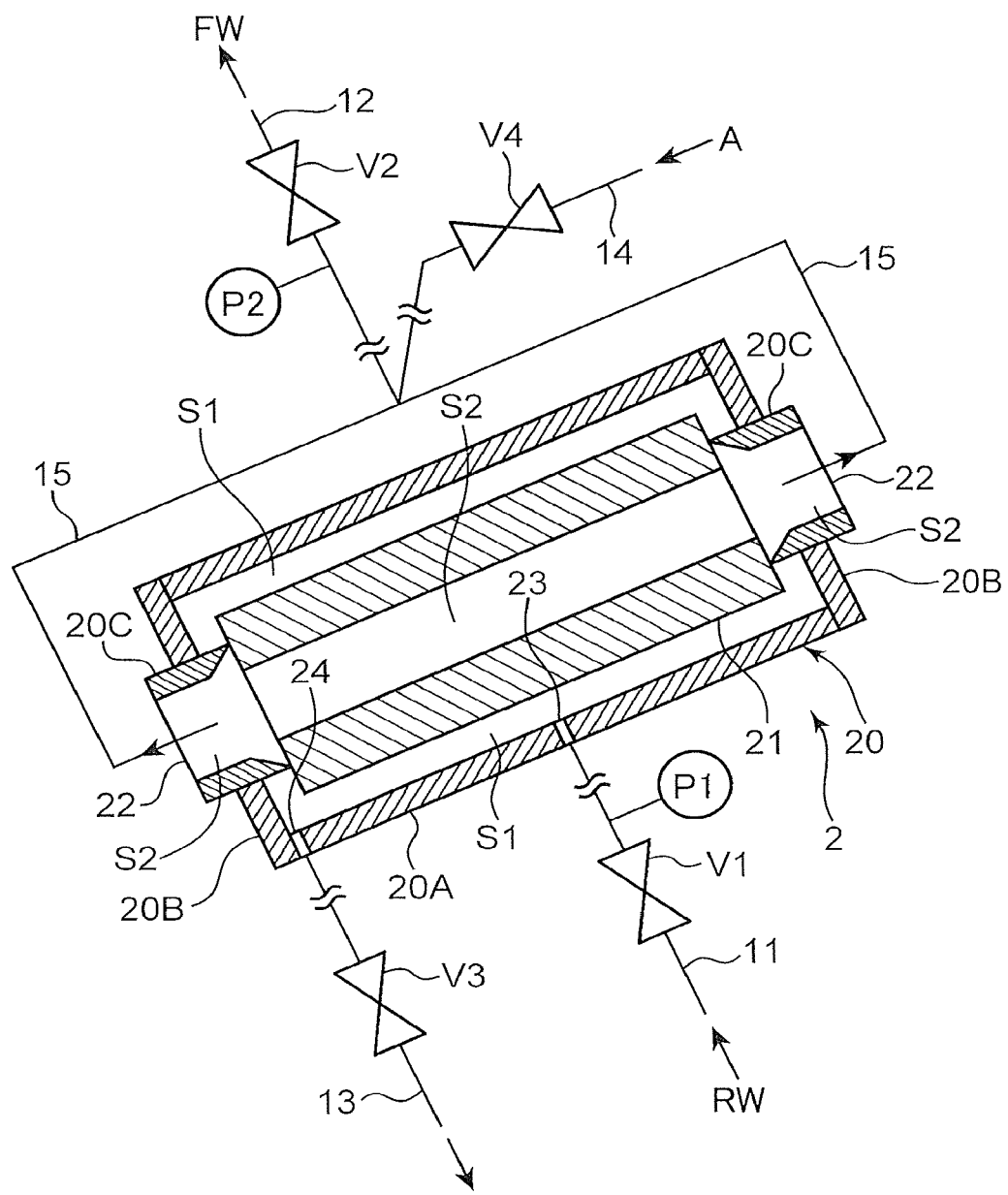
FIG. 2 is a sectional view showing a filtering unit of the ballast water treatment system.

The filtering unit 2 has a function of filtering raw water RW taken into the vessel 100 by the pump 4. As shown in FIG. 2, the filtering unit 2 includes a cylindrical housing 20, and a filter 21 (depth filter 21) arranged in the housing 20. In the filtering unit 2 shown in FIG. 2, although only one filter 21 is provided in the housing 20 as an example, the present invention is not limited thereto, and a plurality of filters 21 may be provided in the housing 20 so as to be arranged in parallel to each other.

The filter 21 shown in FIG. 2 has a cylindrical shape (specifically, hollow circular shape) with both end portions opened. However, the structure of the filter 21 is not limited to a mode shown in FIG. 2, and may have a cylindrical shape with, for example, one end portion opened and the other end portion blocked. The filter 21 is an external pressure type filter configured to pass raw water RW flowing into the housing 20 through the filter 21 from a primary side S1 (an outer side S1 of the filter 21 in FIG. 2) toward a secondary side S2 (an inner side S2 of the filter 21 in FIG. 2).

The primary side S1 is upstream of the filter 21 in a water flow direction in a filtering step to be described later, and the secondary side S2 is downstream of the filter 21 in the water flow direction in the filtering step. Specifically, in the filtering step, in a space on the primary side S1 of the housing 20, the raw water RW yet to be filtered by the filter 21 is present, and in a space on the secondary side S2 of the housing 20, filtered water FW filtered by the filter 21 is present.

The filter 21 is preferably a cartridge type filter detachably housed in the housing 20. In FIG. 2, the filter 21 is arranged so as to have a center axis thereof inclined with respect to a horizontal plane. However, the present invention is not limited thereto, and the filter 21 may be arranged so that the center axis thereof is parallel to a vertical direction or so that the center axis thereof is parallel to a horizontal direction.

Although the filter 21 is of a laminated type produced by forming synthetic fiber or chemical fiber into web, nonwoven fabric, paper, cloth, or the like to be subjected to welding, molding, or the like and processed into a tubular shape, the present invention is not limited thereto. The filter 21 may be a so-called yarn-wound filter around which filament or cotton yarn is spirally wound, or a so-called resin molded type which is a resin molded article such as a sponge.

A material of the filter 21 is preferably a polyolefin-based material such as polyethylene, polypropylene, a polyester-based material, or a composite material thereof. A hole diameter of the filter 21 is preferably on the order of 0.5 μm to 50 μm, with a lower limit of the hole diameter being more preferably 3 μm and an upper limit of the hole diameter being more preferably 30 μm.

As shown in FIG. 2, the housing 20 has a tubular-shaped circumferential wall portion 20A, a pair of end wall portions 20B blocking both ends of the circumferential wall portion 20A, respectively, and a pair of filtered water extracting portions 20C provided at these end wall portions 20B.

The circumferential wall portion 20A surrounds a periphery of the filter 21 with a gap formed between an outer circumferential surface of the filter 21 and the circumferential wall portion 20A. The circumferential wall portion 20A is formed with a raw water supply port 23 and a drain discharge port 24. The raw water supply port 23 is a part for supplying the raw water RW from outside to the primary side S1 in the housing 20. To the raw water supply port 23, the raw water passage 11 to be described later is connected. The drain discharge port 24 is a part for externally discharging a fluid (drain) in the housing 20. To the drain discharge port 24, the discharge passage 13 to be described later is connected.

Each of the filtered water extracting portions 20C has a cylindrical shape with both ends opened. The end portion of the filter 21 comes in contact with a portion of the filtered water extracting portion 20C on the filter 21 side. This sections the space in the housing 20 into the primary side S1 and the secondary side S2 by the filtered water extracting portions 20C and the filter 21. A hollow portion of each of the filtered water extracting portions 20C functions as an outflow port 22. The outflow port 22 is provided at a position corresponding to an opening at the end portion of the filter 21. The filtered water FW flowing through the inner side of the filter 21 (the secondary side S2) flows outside the filtering unit 2 through the outflow port 22.

The raw water passage 11, the filtered water passage 12, the discharge passage 13, the gas passage 14, and a guide passage 15 are directly or indirectly connected to the filtering unit 2. Each passage is formed by piping.

The raw water passage 11 is a passage for supplying the raw water RW to the filtering unit 2 by the pump 4. One end of the raw water passage 11 is connected to the housing 20. The one end of the raw water passage 11 is arranged at a position at which the raw water RW can be guided into the housing 20 (specifically, a position communicating with the primary side S1 in the housing 20). The raw water passage 11 is provided with the pump 4, the first switching valve V1 (the first automatic switching valve V1), and the primary pressure sensor P1.

The filtered water passage 12 is a passage for sending the filtered water FW generated in the filtering unit 2 to the ballast tank 7. In the mode shown in FIG. 2, one end of the filtered water passage 12 is indirectly connected to the housing 20 via the guide passage 15. Specifically, the one end of the filtered water passage 12 is connected to the guide passage 15, and the guide passage 15 is connected to the housing 20. The filtered water passage 12 is arranged so as to communicate with the secondary side S2 in the housing via the guide passage 15. The other end of the filtered water passage 12 is arranged so as to guide the filtered water FW into the ballast tank 7. The filtered water passage 12 is provided with the second switching valve V2 (the second automatic switching valve V2), the secondary pressure sensor P2, and the mixer 5.

The discharge passage 13 is a passage for discharging drain discharged from the filtering unit 2 to the outside of the vessel. One end of the discharge passage 13 is connected to the housing 20. The one end of the discharge passage 13 is arranged at a position which allows water present in the space on the primary side S1 of the housing 20 to flow into the discharge passage 13 (a position communicating with the primary side S1 in the housing). A part of connection of the discharge passage 13 with the housing 20 is located in a lower part of the housing 20. The discharge passage 13 is provided with the third switching valve V3 (the third automatic switching valve V3).

The gas passage 14 is a passage for supplying compressed air A to the filtering unit 2. One end of the gas passage 14 is indirectly connected to the housing 20 via the guide passage 15. Specifically, the one end of the gas passage 14 is connected to the guide passage 15, and the guide passage 15 is connected to the housing 20. The gas passage 14 is arranged so as to communicate with the secondary side S2 in the housing via the guide passage 15. The other end of the gas passage 14 is connected to a gas supply apparatus 8 such as an air compressor 8 which generates the compressed air A. The gas passage 14 is provided with the fourth switching valve V4 (the fourth automatic switching valve V4).

One end of the guide passage 15 is connected to one of the filtered water extracting portions 20C (the outflow port 22) and the other end of the guide passage 15 is connected to the other of the filtered water extracting portions 20C (the outflow port 22). The filtered water FW flowing out from both ends of the filtering unit 2 is guided by the guide passage 15 to the filtered water passage 12, joined at the filtered water passage 12, and sent to the ballast tank 7 side. The compressed air A guided to the filtering unit 2 side through the gas passage 14 is branched at a connection portion with the guide passage 15, and the branched compressed air A is guided to the pair of outflow ports 22 and 22 of the housing 20 through the guide passage 15. This enables the inside of the housing 20 to be pressurized with the compressed air A from the secondary side S2. In the mode shown in FIG. 2, the connection portion of the gas passage 14 with the guide passage 15 is located in the vicinity of a connection portion of the filtered water passage 12 with the guide passage 15.

As the air compressor 8, a compressor mounted on the vessel for another purpose may be used or a compressor dedicated to producing ballast water may be used.

The pump 4 only needs to be capable of sending the raw water RW to the filtering unit 2 through the raw water passage 11, and a structure thereof is not particularly limited. Operation of the pump 4 is controlled by the controller 3.

The mixer 5 is for stirring a chemical agent for sterilization which is put in from the chemical agent tank 6 and the filtered water FW. The mixer 5 is provided downstream of the second switching valve V2 and upstream of the ballast tank 7. The filtered water FW generated in the filtering unit 2 is sent to the mixer 5 through the filtered water passage 12 and is subjected to sterilization treatment in the mixer 5. The filtered water FW subjected to the sterilization treatment flows into the ballast tank 7 and stored in the ballast tank 7.

Although as a chemical agent, for example, hypochlorous acids, peroxide or the like can be used, the present invention is not limited thereto. A method of putting in a chemical agent may be replaced by other known sterilization means used for producing treated water conformed to the International Convention for the Control and Management of Ships' Ballast Water and Sediments. Specific examples of the method include an ozone contact method and an ultraviolet ray irradiation method.

The first switching valve V1 has a function of opening and closing the raw water passage 11, a function of regulating a flow rate of the raw water RW flowing through the raw water passage 11, and the like. The second switching valve V2 has a function of opening and closing the filtered water passage 12. The third switching valve V3 has a function of opening and closing the discharge passage 13. The fourth switching valve V4 has a function of opening and closing the gas passage 14. Although as the switching valves V1 to V4, an electric operated valve, an electromagnetic valve, an air driving valve, or the like can be used, the present invention is not limited thereto. Switching operation of the switching valves V1 to V4 is controlled by the controller 3. As the switching valves V1 to V4, a manual valve not using the controller 3 may be used.

The primary pressure sensor P1 is provided on the raw water passage 11 between the first switching valve V1 and the filtering unit 2, and is capable of sensing a pressure on the primary side S1 in the filtering unit 2. The secondary pressure sensor P2 is provided on the filtered water passage 12 between the second switching valve V2 and the filtering unit 2, and is capable of sensing a pressure on the secondary side S2 in the filtering unit 2. Outputs (sensing data) of the primary pressure sensor P1 and the secondary pressure sensor P2 are input to the controller 3.

The controller 3 has a central processing unit (CPU), a memory, and the like. The controller 3 controls operation of the ballast water treatment system 1.

Figure 3:
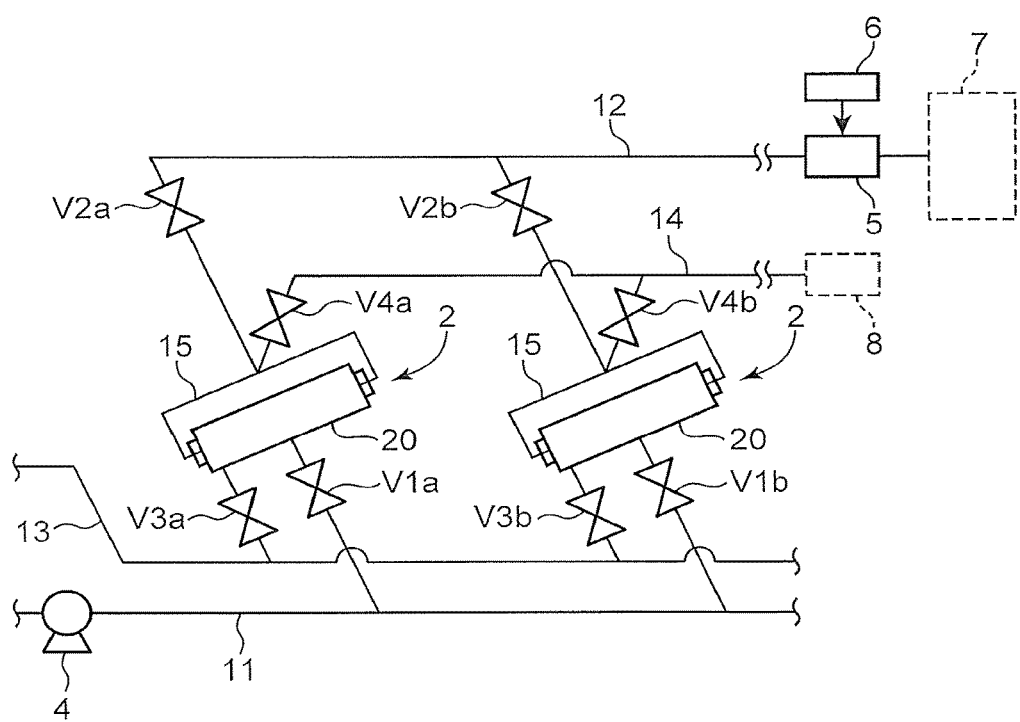
FIG. 3 is a system diagram showing a modification example of the ballast water treatment system.

Although the ballast water treatment system 1 shown in FIG. 1 is provided with one filtering unit 2, the number of the filtering units 2 is not limited to one. Specifically, the ballast water treatment system 1 may include a plurality of the filtering units 2 as shown in FIG. 3.

In this case, the raw water passage 11 is branched downstream of the pump 4 and is connected to the corresponding filtering unit 2. The branched raw water passage 11 is provided with a first switching valve V1 (V1$a$, V1$b$, . . . ) corresponding to each filtering unit 2. The filtered water passage 12 branches upstream of the mixer 5 and is connected to the corresponding filtering unit 2. The branched filtered water passage 12 is provided with a second switching valve V2 (V2$a$, V2$b$, . . . ) corresponding to each filtering unit 2. The discharge passage 13 branches halfway to be connected to the corresponding filtering unit 2. The branched discharge passage 13 is provided with a third switching valve V3 (V3$a$, V3$b$, . . . ) corresponding to each filtering unit 2. The gas passage 14 branches halfway to be connected to the corresponding filtering unit 2. The branched gas passage 14 is provided with a fourth switching valve V4 (V4a, V4b, . . . ) corresponding to each filtering unit 2.

[Ballast Water Production Method]

Next, description will be made of a ballast water production method according to the present embodiment using the ballast water treatment system 1. The production method according to the present embodiment includes a filtering step, a volume-increasing step, a pressurizing step, and a rinsing step (backflow rinsing step).

The filtering step is a step of passing the raw water RW supplied into the housing 20 through the filter 21 from the primary side S1 to the secondary side S2. The volume-increasing step is a step of, after the filtering step, increasing a volume of water present in a space on the secondary side S2 of the housing 20 while the supply of the raw water RW into the housing 20 is stopped. The pressurizing step is a step of, after the volume-increasing step, pressurizing the inside of the housing 20 from the secondary side S2 while the supply of the raw water RW into the housing 20 is stopped. The rinsing step is a step of, after the pressurizing step, passing a fluid through the filter 21 from the secondary side S2 to the primary side S1 while the supply of the raw water RW into the housing 20 is stopped.

In a case where a raw water area includes an extremely large amount of plankton due to red tide or the like, or in a case where domestic waste water, polluted water, or water containing a large volume of soil due to natural disaster flows into a raw water area, so that the raw water area contains a large amount of suspended substances, a water flow resistance in the ballast water treatment system 1 rises so sharply that a filter can be easily blocked. In such a case, when the raw water RW is treated using the production method according to the present embodiment, a life of the filter 21 can be drastically increased as compared with a conventional filter.

With the production method according to the present embodiment, even when marine microbes or suspended particles removed by filtering are discharged to the original sea area as they are, a marine ecosystem is hardly destroyed. Moreover, since a large part of marine microbes and suspended particles can be removed, an amount of a sterilizer used for a subsequent sterilization step can be reduced or an intensity of an ultraviolet ray to be radiated can be mitigated, so that a small-sized system with reduced power consumption can be realized.

In the following, the ballast water production method according to the present embodiment will be more specifically described with respect to first to sixth embodiments shown in FIG. 4 to FIG. 9. However, the ballast water production method is not limited to the first to sixth embodiments described below. Additionally, FIG. 10 and FIG. 11 show steps of the ballast water production method according to first and second reference examples. In tables of steps shown in these FIG. 4 to FIG. 11, "open" denoted in a field represents that a switching valve corresponding to the field is "opened", and a blank field represents that a switching valve corresponding to the field is "closed". Additionally, in the tables of steps of the first to sixth embodiments shown in FIG. 4 to FIG. 9, time of each step is merely one example and is not limited to these numerical values.

[First Embodiment]

FIG. 4 is a table showing one example of steps in the ballast water production method according to the embodiment. As shown in FIG. 4, in the ballast water production method of the first embodiment, the filtering step, the volume-increasing step, the pressurizing step, the rinsing step, and a draining step are conducted in this order.

(Filtering Step)

As shown in FIG. 4, in the filtering step, the controller 3 controls the switching valves V1 to V4 to cause the first switching valve V1 and the second switching valve V2 to be opened and the third switching valve V3 and the fourth switching valve V4 to be closed.

In the filtering step, opening the switching valves V1 and V2 allows an inflow of the raw water RW from the raw water passage 11 into the filtering unit 2 and an outflow of the filtered water FW from the filtering unit 2 to the filtered water passage 12. On the other hand, closing the switching valves V3 and V4 suppresses a water outflow from the filtering unit 2 to the discharge passage 13 and an inflow of the compressed air A from the gas passage 14 to the filtering unit 2.

Then, the controller 3 controls the pump 4 to start operation of the pump 4. As a result, in the filtering step, the raw water RW is supplied to the filtering unit 2 through the raw water passage 11. The supplied raw water RW passes through the filter 21 from the outer side S1 (the primary side S1) of the filter 21 toward the inner side S2 (the secondary side S2) of the filter 21. At this time, foreign matters included in the raw water RW are captured by the filter 21. The filtered water FW obtained after passing through the filter 21 flows through the inner side S2 of the filter 21 to flow out of the filtering unit 2 from the outflow port 22. The outflowing filtered water FW is sent to the mixer 5 through the filtered water passage 12 and is subjected to sterilization treatment in the mixer 5. The filtered water FW having been subjected to the sterilization treatment flows into the ballast tank 7 and is stored in the ballast tank 7.

When the filtering step is conducted, foreign matters clog the filter 21 to increase the water flow resistance. The water flow resistance can be determined based on a differential pressure $\Delta P$ between the primary pressure sensor P1 and the secondary pressure sensor P2.

Although the controller 3 may control the pump 4, the switching valves V1 to V4, and the like so as to finish the filtering step, for example, when the differential pressure $\Delta P$ reaches a predetermined reference value, the present invention is not limited thereto. The control may be conducted such that, for example, when a lapse of time after the filtering step starts reaches a predetermined set time, the filtering step is finished. While the set time is set to be 300 seconds in the filtering step in FIG. 4, the present invention is not limited to this numerical value. Additionally, the filtering step may be manually finished based on determination by a user who manages operation of the ballast water treatment system 1.

In the first embodiment, when the filtering step is finished, the volume-increasing step and the pressurizing step are conducted in order to increase rinsing efficiency in the rinsing step before the rinsing step is conducted for decreasing an increased water flow resistance.

(Volume-Increasing Step)

In the volume-increasing step, the controller 3 controls the pump 4 to stop operation of the pump 4. Additionally, as shown in FIG. 4, by controlling the switching valves V1 to V4, the controller 3 switches the first switching valve V1 to be closed, maintains the second switching valve V2 to be opened, and maintains the third switching valve V3 and the fourth switching valve V4 to be closed.

In the volume-increasing step, stopping the pump 4 and closing the first switching valve V1 leads to stopping supply of the raw water RW to the filtering unit 2. Additionally, maintaining the switching valves V3 and V4 to be closed leads to suppression of an outflow of water from the filtering unit 2 to the discharge passage 13 and an inflow of the compressed air A from the gas passage 14 to the filtering unit 2.

On the other hand, in order to allow the filtered water FW remaining in the filtered water passage 12 or the guide passage 15 to flow back to the space on the secondary side S2 of the housing 20, the second switching valve V2 is maintained to be opened. This causes a part of the filtered water FW present in the filtered water passage 12 or the guide passage 15 to flow into the space on the secondary side S2 of the housing 20 (the inner space of the filter 21). As a result, the volume of water present in the space on the secondary side S2 of the housing 20 can be increased.

Accordingly, in the rinsing step conducted after the volume-increasing step, as a fluid for use in rinsing, not only the compressed air A but also water (an increased volume of water present in the space on the secondary side S2 of the housing 20) can be used. Thus, since the water in the space on the secondary side S2 is increased in volume in the volume-increasing step, a fluid for use in the rinsing step reliably contains not only the compressed air A but also water. Therefore, as compared with a case where a fluid used in the rinsing step is only the compressed air A, a force exerted on foreign matters when the fluid passes through the filter 21 from the secondary side S2 to the primary side S1 can be increased. This enables an increase in an effect of removing the foreign matters from the filter 21 in the rinsing step to be described later.

In the embodiment shown in FIG. 1 and FIG. 2, an upstream part of the filtered water passage 12 (a part on the filtering unit 2 side in the filtered water passage 12) extends in an upward direction separating from the filtering unit 2 (or upward obliquely). Specifically, the upstream part of the filtered water passage 12 is arranged above a hollow portion (the space on the secondary side S2 of the housing 20) of the filter 21. Since the upstream part of the filtered water passage 12 is arranged at such a position as described above, the filtered water FW present in the filtered water passage 12 is likely to move downward through the filtered water passage 12 due to gravity and to flow into the hollow portion of the filter 21 via the guide passage 15. This enables a volume increasing effect in the volume-increasing step to be enhanced, the volume-increasing step of causing the filtered water FW to flow into the space on the secondary side S2 of the housing 20.

Although the controller 3 may control the switching valves V1 to V4 or the like to finish the volume-increasing step when a lapse of time after the start of the volume-increasing step reaches a predetermined set time, the present invention is not limited to such control. The set time in the volume-increasing step can be determined according to, for example, a size of the filtering unit 2, an inner diameter of the filtered water passage 12, an inner diameter of the guide passage 15, a length of the filtered water passage 12, a length of the guide passage 15, or the like. Specifically, the set time in the volume-increasing step can be set, for example, within a range of about several seconds to several tens of seconds (more specifically, on the order of 1 to 30 seconds). Although in the volume-increasing step in FIG. 4, the set time is set to be 3 seconds, the present invention is not limited to this numerical value. In the first embodiment, when the volume-increasing step is finished, the pressurizing step is conducted.

(Pressurizing Step)

As shown in FIG. 4, in the pressurizing step, by controlling the switching valves V1 to V4, the controller 3 maintains the first switching valve V1 to be closed, switches the second switching valve V2 to be closed, maintains the third switching valve V3 to be closed, and switches the fourth switching valve V4 to be opened. Switching of the fourth switching valve V4 to be opened may be simultaneous with switching of the second switching valve V2 to be closed, or may be after switching of the second switching valve V2 to be closed.

In the pressurizing step, the pump 4 is maintained to be stopped, while the first switching valve V1 is maintained to be closed, thereby maintaining stop of a supply of the raw water RW to the filtering unit 2. Additionally, in the pressurizing step, switching of the second switching valve V2 from being opened to being closed suppresses an inflow of the filtered water FW into the space on the secondary side S2 of the housing 20 and an outflow of the filtered water FW from the space on the secondary side S2 of the housing 20. Additionally, maintaining the third switching valve V3 to be closed suppresses an outflow of water from the filtering unit 2 to the discharge passage 13.

On the other hand, since the fourth switching valve V4 is switched from being closed to being opened, a pressure by the compressed air A generated in the air compressor 8 is applied to the filtering unit 2. Specifically, a pressurizing force in the pressurizing step is exerted on the foreign matters captured by the filter 21 from the secondary side S2 (the inner side of the filter 21) toward the primary side S1 (the outer side of the filter 21). Accordingly, the foreign matters attached to a surface on the primary side S1 of the filter 21 are brought to be easily peeled from the surface and additionally, the foreign matters entering into the filter 21 from the primary side S1 are brought to be easily pushed out to the primary side S1. Thus, the pressurizing step enables a state of the foreign matters to the filter 21 to be changed in advance such that the foreign matters can be easily removed in the subsequent rinsing step. This enables a further increase in the effect of removing the foreign matters from the filter 21 in the rinsing step after the pressurizing step.

Moreover, before the pressurizing step, the volume of water present in the space on the secondary side S2 of the housing 20 is increased by the volume-increasing step. Accordingly, when the inside of the housing 20 is pressurized from the secondary side S2 in the pressurizing step, not only a pressurizing force by the compressed air A but also a pressurizing force by water present in the space on the secondary side S2 can be exerted on the foreign matters captured by the filter 21. This enables such a state change of the foreign matters to the filter 21 as described above to be more effectively caused in the pressurizing step.

Additionally, when a large volume of water is present in the space on the secondary side S2 of the housing 20 at the time of pressurizing from the secondary side S2 in the pressurizing step (preferably, when the space on the secondary side S2 is filled with water), it is assumed that a pressurizing force from the secondary side S2 in the pressurizing step can be expected to be more evenly exerted on the filter 21 via water.

In the pressurizing step, since the first switching valve V1 and the third switching valve V3 are closed, an outflow of water from the filtering unit 2 to the raw water passage 11 and an outflow of water from the filtering unit 2 to the discharge passage 13 are suppressed. Accordingly, movement of the filtered water FW present in the space on the secondary side S2 of the housing 20 to the space on the primary side S1 is regulated to some extent. As a result, even after the inside of the housing 20 is pressurized from the secondary side S2 in the pressurizing step, a volume of water necessary for increasing a rinsing effect in the rinsing step is allowed to remain in the space on the secondary side S2 of the housing 20.

A pressure (a differential pressure between an instructed pressure of the secondary pressure sensor P2 and an instructed pressure of the primary pressure sensor P1) by the compressed air A applied in the housing 20 in the pressurizing step is preferably within a range of 0.1 MPa to 5 MPa. A lower limit of the pressure by the compressed air A is more preferably 0.2 MPa and is further preferably 0.3 MPa. An upper limit of the pressure by the compressed air A is more preferably 3 MPa and is further preferably 2 MPa.

Although the controller 3 may control the switching valves V1 to V4 or the like to finish the pressurizing step when a lapse of time after the start of the pressurizing step reaches a predetermined set time, the present invention is not limited to such control. The set time in the pressurizing step can be determined according to, for example, the size of the filtering unit 2. Specifically, the set time in the pressurizing step can be set, for example, within a range of about several seconds to several tens of seconds (more specifically, on the order of 1 to 30 seconds). Although in the pressurizing step in FIG. 4, the set time is set to be 3 seconds, the present invention is not limited to this numerical value. In the first embodiment, when the pressurizing step is finished, the rinsing step is conducted.

(Rinsing Step)

As shown in FIG. 4, in the rinsing step, the controller 3 controls the switching valves V1 to V4 to maintain the first switching valve V1 and the second switching valve V2 to be closed, to switch the third switching valve V3 to be opened, and to maintain the fourth switching valve V4 to be opened.

In the rinsing step, the pump 4 is maintained to be stopped, while the first switching valve V1 is maintained to be closed, thereby maintaining stop of a supply of the raw water RW to the filtering unit 2. Additionally, in the rinsing step, maintaining the second switching valve V2 to be closed suppresses an inflow of the filtered water FW into the space on the secondary side S2 of the housing 20 and an outflow of the filtered water FW from the space on the secondary side S2 of the housing 20.

On the other hand, as a result of causing the third switching valve V3 and the fourth switching valve V4 to be opened, the compressed air A is pressed from the gas passage 14 into the space on the secondary side S2 of the housing 20 (a hollow portion of the filter 21). This causes the filtered water FW present in the hollow portion of the filter 21 to be pressed by the compressed air A to pass through the filter 21 from the secondary side S2 to the primary side S1 (from the inner side to the outer side), which is a direction opposite to that in the filtering step. Thus, the foreign matters captured in the filter 21 and the foreign matters attached to the outer circumferential surface of the filter 21 are pushed out into a space between the filter 21 and the housing 20 (a space on the secondary side S2). As a result, a water flow resistance caused by clogging of the filter 21 is reduced.

The foreign matters pushed out of the filter 21 are discharged to the discharge passage 13 together with a fluid (the compressed air A and water) used for rinsing. The fluid including foreign matters pushed out from the filter 21 in the rinsing step is likely to gather in the vicinity of a lower position in the housing 20 (lower left in the housing 20 in FIG. 2) due to its own weight. In the embodiment shown in FIG. 2, since the discharge passage 13 is connected to a lower part of the housing 20, the fluid including the foreign matters is efficiently discharged from the discharge passage 13. The fluid discharged to the discharge passage 13 flows as a drain through the discharge passage 13 to be discharged to the outside of the vessel.

A pressure (a differential pressure between an instructed pressure of the secondary pressure sensor P2 and an instructed pressure of the primary pressure sensor P1) by the compressed air A applied in the housing 20 in the rinsing step is preferably within a range of 0.1 MPa to 5 MPa. A lower limit of the pressure by the compressed air A is more preferably 0.2 MPa and is further preferably 0.3 MPa. An upper limit of the pressure by the compressed air A is more preferably 3 MPa and is further preferably 2 MPa.

Although the controller 3 may control the switching valves V1 to V4 or the like to finish the rinsing step when a lapse of time after the start of the rinsing step reaches a predetermined set time, the present invention is not limited to such control. The set time in the rinsing step can be determined according to, for example, the size of the filtering unit 2. Specifically, the set time in the rinsing step can be set, for example, within a range of about several seconds to several tens of seconds (more specifically, on the order of 1 to 30 seconds). Although in the rinsing step in FIG. 4, the set time is set to be 10 seconds, the present invention is not limited to this numerical value. In the first embodiment, when the rinsing step is finished, the draining step is conducted.

(Draining Step)

As shown in FIG. 4, in the draining step, the controller 3 controls the switching valves V1 to V4 to maintain the first switching valve V1 and the second switching valve V2 to be closed, maintain the third switching valve V3 to be opened, and switch the fourth switching valve V4 from being opened to being closed.

In the draining step, the pump 4 is maintained to be stopped, while the first switching valve V1 is maintained to be closed, thereby maintaining stop of a supply of the raw water RW to the filtering unit 2. Additionally, in the draining step, maintaining the second switching valve V2 to be closed suppresses an inflow of the filtered water FW into the space on the secondary side S2 of the housing 20 and an outflow of the filtered water FW from the space on the secondary side S2 of the housing 20. Additionally, in the draining step, since the fourth switching valve V4 is switched to be closed, an inflow of the compressed air A from the gas passage 14 to the filtering unit 2 is suppressed.

On the other hand, since the third switching valve V3 is maintained to be opened, the water in the housing 20 is discharged to the outside through the discharge passage 13.

Although the controller 3 may control the switching valves V1 to V4 or the like to finish the draining step when a lapse of time after the start of the draining step reaches a predetermined set time, the present invention is not limited to such control. The set time in the draining step can be determined according to, for example, the size of the filtering unit 2. Specifically, the set time in the draining step can be set, for example, within a range of about several seconds to several tens of seconds (more specifically, on the order of 1 to 30 seconds). Although in the draining step in FIG. 4, the set time is set to be 10 seconds, the present invention is not limited to this numerical value. In the first embodiment, when the draining step is finished, the above filtering step, volume-increasing step, pressurizing step, rinsing step, and draining step may be conducted in this order. Additionally, when the draining step is finished, operation of the ballast water treatment system 1 may be finished.

[Second Embodiment]

FIG. 5 is a table showing another example of steps of the ballast water production method according to the embodiment. As show in FIG. 5, a second embodiment is different from the first embodiment in repeating a set of a pressurizing step and a rinsing step (specifically, a set of the pressurizing step, the rinsing step, and a draining step) a plurality of times between a filtering step and a subsequent filtering step. Specific contents of each step are the same as those of the first embodiment, and therefore description thereof will be omitted. Although in the filtering step of the second embodiment shown in FIG. 5, a set time is set to be 240 seconds, the present invention is not limited to this numerical value.

As shown in FIG. 5, in the second embodiment, after a pressurizing step 1, a rinsing step 1, and a draining step 1 are conducted, a pressurizing step 2, a rinsing step 2, and a draining step 2 are conducted. Thus, the effect of removing foreign matters captured by a filter 21 can be further increased as compared with that in the first embodiment. In the second embodiment, the draining step 1 between a set of the pressurizing step 1 and the rinsing step 1 and a set of the pressurizing step 2 and the rinsing step 2 can be omitted.

[Third Embodiment]

FIG. 6 is a table showing yet another example of steps of the ballast water production method according to the embodiment. As shown in FIG. 6, a third embodiment is different from the first embodiment in conducting a volume-reduction step and the same as the first embodiment in the other steps.

The volume-reduction step is a step of reducing a volume of water present in a space on a primary side S1 of a housing 20 after a filtering step and before a rinsing step. In the volume-reduction step after the filtering step, a controller 3 controls a pump 4 to stop operation of the pump 4. Additionally, as shown in FIG. 6, the controller 3 controls switching valves V1 to V4 to switch the first switching valve V1 to be closed, maintain the second switching valve V2 to be opened, switch the third switching valve V3 to be opened, and maintain the fourth switching valve V4 to be closed.

In the volume-reduction step, the pump 4 stops and the first switching valve V1 is closed, so that supply of raw water RW to a filtering unit 2 is stopped. Additionally, maintaining the fourth switching valve V4 to be closed suppresses an inflow of compressed air A from a gas passage 14 to the filtering unit 2.

On the other hand, opening the third switching valve V3 allows an outflow of water from the filtering unit 2 to a discharge passage 13. This causes the water present in the space on the primary side S1 of the housing 20 to flow out to the discharge passage 13. At this time, since the second switching valve V2 is also opened, it is possible to cause the water present in the space on the primary side S1 of the housing 20 to smoothly flow out to the discharge passage 13.

Although in the specific example shown in FIG. 6, the volume-reduction step is conducted before a volume-increasing step, the present invention is not limited thereto, and in the third embodiment, the volume-reduction step may be conducted after the volume-increasing step. However, in the volume-reduction step, as the water present in the space on the primary side S1 of the housing 20 flows out to the discharge passage 13, water present in the space on a secondary side S2 of the housing 20 flows into the space on the primary side S1 in some cases. Accordingly, in view of a necessity of having an increased volume of water present in the space on the secondary side S2 of the housing 20 at the start of the rinsing step, the volume-reduction step is preferably conducted before the volume-increasing step.

In the third embodiment shown in FIG. 6, the volume of the water present in the space on the primary side S1 of the housing 20 is reduced by the volume-reduction step before the rinsing step. Thus, it is possible to increase in advance a space (void) in which no water is present on the primary side S1 of the housing 20 before the rinsing step. Accordingly, in the rinsing step conducted thereafter, a fluid is more likely to pass forcefully through the filter from the secondary side S2 to the primary side S1. Specifically, in the rinsing step of the third embodiment, a resistance when a fluid moves from the secondary side S2 to the primary side S1 is reduced as compared with the first embodiment in which no volume-reduction step is conducted. Thus, forceful passing of a fluid through the filter 21 from the secondary side S2 to the primary side S1 in the rinsing step further increases the effect of removing foreign matters from the filter 21, thereby further improving the rinsing effect.

Although the controller 3 may control the switching valves V1 to V4 such that the volume-reduction step is finished when a lapse of time after the start of the volume-reduction step reaches a predetermined set time, the present invention is not limited to such control. The set time in the volume-reduction step can be determined according to, for example, a size of the filtering unit 2. Specifically, the set time in the volume-reduction step can be set, for example, within a range of about several seconds to several tens of seconds (more specifically, on the order of 1 to 30 seconds). Although in the volume-reduction step in FIG. 6, the set time is set to be 10 seconds, the present invention is not limited to this numerical value. In the third embodiment, when the volume-reduction step is finished, the same volume-increasing step as the volume-increasing step in the first embodiment is conducted.

[Fourth Embodiment]

FIG. 7 is a table showing still another example of steps of the ballast water production method according to the embodiment. As shown in FIG. 7, in a fourth embodiment, a first half of the steps from a filtering step, a volume-increasing step, a pressurizing step 1, to a rinsing step 1 is the same as the four steps from the filtering step to the rinsing step in the first embodiment shown in FIG. 4 except that a set time of the filtering step is set to be 240 seconds. Additionally, in the fourth embodiment, a latter half of the steps conducted thereafter, i.e., a volume-reduction step, the volume-increasing step, a pressurizing step 2, a rinsing step 2, and a draining step are the same as the five steps from the volume-reduction step to the draining step in the third embodiment shown in FIG. 6.

Specifically, in the fourth embodiment, in the first half of the steps, a filter 21 is preliminarily rinsed, and in the latter half of the steps, the filter 21 is carefully rinsed. In this fourth embodiment, a part or all of the foreign matters not removed from the filter 21 in the first half of the steps can be removed in the latter half of the steps.

[Fifth Embodiment]

FIG. 8 is a table showing still another example of steps of the ballast water production method according to the embodiment. As shown in FIG. 8, in a fifth embodiment, a ballast water treatment system 1 including a plurality of filtering units 2 as shown in FIG. 3 is used. Specifically, in the fifth embodiment, two filtering units 2 (a first filtering unit 2 and a second filtering unit 2) are provided. A shown in FIG. 3 and FIG. 8, the first filtering unit 2 is configured to have an inflow or an outflow of a fluid to be allowed or suppressed by a first switching valve V1a, a second switching valve V2a, a third switching valve V3a, and a fourth switching valve V4a, and the second filtering unit 2 is configured to have an inflow or an outflow of a fluid to be allowed or suppressed by a first switching valve V1b, a second switching valve V2b, a third switching valve V3b, and a fourth switching valve V4b.

In the table of steps shown in FIG. 8, a "filtering step ab" indicates that the filtering step is conducted using both the first filtering unit 2 and the second filtering unit 2. Additionally, in the table of steps shown in FIG. 8, a "volume-increasing step a", a "pressurizing step a", a "rinsing step a", and a "draining step a" are steps conducted in the first filtering unit 2, and when these steps are being conducted, a filtering step b is being conducted in the second filtering unit 2. In the table of steps shown in FIG. 8, a "volume-increasing step b", a "pressurizing step b", a "rinsing step b", and a "draining step b" are steps conducted in the second filtering unit 2, and when these steps are being conducted, a filtering step a is being conducted in the first filtering unit 2.

Specifically, as shown in FIG. 8, in the fifth embodiment, when the volume-increasing step a, the pressurizing step a, the rinsing step a, and the draining step a are being conducted using the first filtering unit 2, the filtering step b can be continuously conducted using the second filtering unit 2. On the other hand, while the volume-increasing step b, the pressurizing step b, the rinsing step b, and the draining step b are being conducted using the second filtering unit 2, the filtering step a can be continuously conducted using the first filtering unit 2.

Thus, in the fifth embodiment, while one filtering unit 2 is conducting steps other than the filtering step, such as the pressurizing step, the rinsing step, or the like, the other filtering unit 2 conducts the filtering step. Thus, it is possible to reduce time during which the filtering step is interrupted (time during which the filtering step is not conducted) to conduct steps other than the filtering step.

In the filtering step ab in the fifth embodiment shown in FIG. 8, a set time is set to be 150 seconds. However, the present invention is not limited to this numerical value.

[Sixth Embodiment]

FIG. 9 is a table showing still another example of steps of the ballast water production method according to the embodiment. As shown in FIG. 9, a sixth embodiment is different from the fifth embodiment in that a volume-reduction step a is conducted between a filtering step ab and a volume-increasing step a, and a volume-reduction step b is conducted between the filtering step ab and a volume-increasing step b, and the other steps are the same as those of the fifth embodiment. The volume-reduction step a is a step conducted by a first filtering unit 2 and the volume-reduction step b is a step conducted by a second filtering unit 2. These volume-reduction step a and volume-reduction step b are the same as the volume-reduction step in the third embodiment shown in FIG. 6.

When the volume-reduction step a is being conducted in the first filtering unit 2, the filtering step b is being conducted in the second filtering unit 2. Additionally, when the volume-reduction step b is being conducted in the second filtering unit 2, a filtering step a is being conducted in the first filtering unit 2.

In the sixth embodiment, since the volume-reduction step a and the volume-reduction step b are conducted, a resistance when a fluid moves from a secondary side S2 to a primary side S1 in a rinsing step a and a rinsing step b is reduced as compared with a case of the fifth embodiment in which the volume-reduction step is not conducted. Thus, forceful passing of a fluid through a filter 21 from the secondary side S2 to the primary side S1 in the rinsing step further increases the effect of removing foreign matters from the filter 21, thereby further improving the rinsing effect.

In the filtering step ab in the sixth embodiment shown in FIG. 9, a set time is set to be 150 seconds. However, the present invention is not limited to this numerical value.

FIRST REFERENCE EXAMPLE

FIG. 10 is a table showing steps of a ballast water production method according to a first reference example. The first reference example shown in FIG. 10 is different from the first embodiment in that neither a volume-increasing step nor a pressurizing step is conducted, and is the same as the first embodiment in the other steps.

SECOND REFERENCE EXAMPLE

FIG. 11 is a table showing steps of a ballast water production method according to a second reference example. The second reference example shown in FIG. 11 is different from the first embodiment in that neither a volume-increasing step nor a pressurizing step is conducted and that a switching step is conducted, and is the same as the first embodiment in the other steps. In the switching step in the second reference example, a third switching valve V3 is switched to be opened after a filtering step is conducted.

[Evaluation]

FIG. 12 is a table showing an evaluation result of comparison between the first to sixth embodiments and the first and second reference examples. Test conditions for the comparison are as follows.

As raw water RW for use in the test, to a natural seawater 400 L taken from Kurashiki-city in Okayama Prefecture, phytoplankton (tetraselmis sp.) was added so as to have a population of 2000/mL and sea sand adjusted to have a particle size of 80 mesh path was added so as to be 150 mg/L. The raw water was supplied to the housing 20 of the filtering unit 2 at a flow rate of 50 L/min while being stirred. In a case of two housings 20 (the fifth and sixth embodiments), a total filtering flow rate was set to be 50 L/min. A tubular filter 21 made of polyolefin with an outer dimension of 65 mm, an inner diameter of 30 mm, and a length of 250 mm was attached to the housing 20 to conduct the filtering step by causing the raw water RW to pass through the filter 21 from an outer surface (the primary side S1) to an inner surface (the secondary side S2). The steps in the first to sixth embodiments and the first and second reference examples are as shown in FIG. 4 to FIG. 11.

While, in each of the first to sixth embodiments and the first and second reference examples, continuing the steps shown in FIG. 4 to FIG. 11, an input pressure (an instructed pressure of the primary pressure sensor P1) and an output pressure (an instructed pressure of the secondary pressure sensor P2) of the housing 20 were measured and at a time point when a differential pressure thereof reaches 100 kPa, the test was finished.

As shown in FIG. 12, in the first to sixth embodiments, the ballast water treatment system 1 can be operated for a longer period of time than in the first and second reference examples. In particular, the fifth and sixth embodiments enable a longer time of operation than in the first to fourth embodiments.

MODIFICATION EXAMPLE

The present invention is not limited to the above embodiment but can be variously changed within a range not departing from the gist of the present invention.

In the rinsing step, the production method according to the present embodiment and other methods (other steps) can be combined. For example, with raw water being present in a space on the outer side (the primary side S1) of the filter 21, the rinsing step may be conducted, which is followed by discharging of the raw water on the outer side of the filter 21 to execute the rinsing step.

In the embodiment, although the pump 4 is provided in the raw water passage 11, the pump 4 only needs to be capable of supplying raw water to the filtering unit 2 through the raw water passage 11, and a place where the pump 4 is disposed is not limited to the raw water passage 11.

In the embodiment, the case has been exemplified where the gas supply apparatus 8 is the air compressor 8 and gas sent through the gas passage 14 to the filtering unit 2 is air. However, the present invention is not limited thereto, and the gas supply apparatus 8 may be configured to send gas other than air (e.g., nitrogen etc.) to the filtering unit 2 through the gas passage 14.

As described above, the present embodiment provides a ballast water production method enabling effective recovery of a water flow resistance increased by the execution of the filtering step and enabling operation of a ballast water treatment system for a long period of time, and the ballast water treatment system.

The ballast water production method provided by the present embodiment uses a filtering unit having a housing and a filter housed in the housing. The production method of the present embodiment includes a filtering step, a volume-increasing step, a pressurizing step, and a rinsing step. The filtering step is a step of passing raw water supplied into the housing through the filter from a primary side that is upstream of the filter to a secondary side that is downstream of the filter. The volume-increasing step is a step of, after the filtering step, increasing a volume of water present in a space on the secondary side of the housing while the supply of the raw water into the housing is stopped. The pressurizing step is a step of, after the volume-increasing step, pressurizing the inside of the housing from the secondary side while the supply of the raw water into the housing is stopped. The rinsing step is a step of, after the pressurizing step, passing a fluid through the filter from the secondary side to the primary side while the supply of the raw water into the housing is stopped.

In the filtering step, raw water passes through the filter from the primary side to the secondary side, so that foreign matters included in the raw water are captured by the filter as a result of attachment to a surface on the primary side of the filter or entering into the filter from the primary side. Then, in order to reduce a water flow resistance increased by the execution of the filtering step, the rinsing step is conducted. In the present embodiment, before execution of the rinsing step, the volume-increasing step and the pressurizing step are conducted in order to increase the rinsing effect in the rinsing step.

Execution of the volume-increasing step increases the volume of water present in the space on the secondary side of the housing. Accordingly, as a fluid for use in the rinsing step (i.e., a fluid passing through the filter from the secondary side to the primary side in the rinsing step), not only gas such as air but also an increased volume of water present in the space on the secondary side of the housing can be used. Thus, in the present embodiment, since a fluid used in the rinsing step is to certainly contain not only gas but also water, as compared with a case where a fluid used in the rinsing step contains only gas, it is possible to increase a force exerted on foreign matters (foreign matters captured by the filter) when the fluid passes through the filter from the secondary side to the primary side. This enables an increase in the effect of removing the foreign matters from the filter in the rinsing step.

Additionally, in the pressurizing step, the inside of the housing is pressurized from the secondary side. Specifically, a pressurizing force in the pressurizing step is exerted on the foreign matters captured by the filter from the secondary side toward the primary side. Accordingly, the foreign matters attached to the surface on the primary side of the filter are brought to be easily peeled from the surface and additionally, the foreign matters entering into the filter from the primary side are brought to be easily pushed out to the primary side. Thus, the pressurizing step enables a state of the foreign matters to the filter to be changed in advance such that the foreign matters can be easily removed in the subsequent rinsing step. This enables a further increase in the effect of removing the foreign matters from the filter in the rinsing step after the pressurizing step.

Moreover, in the present embodiment, before the pressurizing step, the volume of water present in the space on the secondary side of the housing is increased by the volume-increasing step. Accordingly, when the inside of the housing is pressurized from the secondary side in the pressurizing step, not only a pressurizing force by gas such as air is exerted on the foreign matters captured by the filter but also a pressurizing force by water present in the space on the secondary side can be exerted thereon. This enables such a state change of the foreign matters to the filter as described above to be more effectively caused in the pressurizing step.

Additionally, at the time of pressurization from the secondary side in the pressurizing step, when a large volume of water is present in the space on the secondary side of the housing (preferably, when the space on the secondary side is filled with water), it is assumed that a pressurizing force from the secondary side in the pressurizing step can be expected to be more evenly exerted on the filter via water.

As described above, in the present embodiment, the volume-increasing step and the pressurizing step as described above are conducted before execution of the rinsing step. Thus, the rinsing effect in the rinsing step can be enhanced, thereby improving the rinsing efficiency.

The ballast water production method preferably includes a volume-reduction step of reducing a volume of water present in the space on the primary side of the housing after the filtering step and before the rinsing step.

In this method, the volume of water present in the space on the primary side of the housing is reduced by the volume-reduction step before the rinsing step. Thus, it is possible to increase in advance a space (void) in which no water is present on the primary side of the housing before the rinsing step. Accordingly, in the rinsing step conducted thereafter, a fluid is more likely to pass forcefully through the filter from the secondary side to the primary side. Specifically, the step is as follows.

Since the rinsing step is conducted after the filtering step, there occurs a case where, at the start of the rinsing step, a part of raw water introduced into the housing in the filtering step remains in the space on the primary side of the housing. When a large volume of water is present in the space on the primary side of the housing, a part (void) in which no water is present in the space on the primary side of the housing is reduced by the volume of the water. Thus, when the rinsing step is conducted with a reduced void on the primary side, a fluid having passed through the filter from the secondary side to the primary side flows into the primary side so as to be mixed with water present in the space on the primary side.

In other words, water present in the space on the primary side, as a resistance, reduces a force of the fluid at the time of flowing to the primary side, the fluid passing from the secondary side to the primary side, thereby reducing a force of the fluid when passing through the filter.

On the other hand, execution of the volume-reduction step before the rinsing step enables a part (void) in which no water is present on the primary side of the housing to be increased in advance before the rinsing step. Accordingly, in the subsequent rinsing step, a resistance when a fluid moves from the secondary side to the primary side is reduced more than in a case where the volume-reduction step is not conducted. Specifically, in the rinsing step, when a fluid moves from the secondary side to the primary side, water is hard to become a resistance in the space on the primary side of the housing. Thus, reduction in a force of the fluid when passing through the filter can be also suppressed. Accordingly, forceful passing of a fluid through the filter from the secondary side to the primary side in the rinsing step further increases the effect of removing foreign matters from the filter, thereby further improving the rinsing effect.

In the ballast water production method, the pressurizing step and the rinsing step are preferably conducted a plurality of times between the filtering step and a subsequent filtering step.

In this method, the pressurizing step and the rinsing step are conducted a plurality of times between the filtering step and the subsequent filtering step. Thus, the effect of removing foreign matters captured by the filter can be further enhanced.

In the ballast water production method, it is preferable that a plurality of the filtering units provided, and when the pressurizing step or the rinsing step is being conducted using any of the filtering units, the filtering step is conducted using other filtering units.

In this method, when any of the filtering units is conducting the pressurizing step or the rinsing step, other filtering units conduct the filtering step. Thus, time for interrupting the filtering step in order to conduct the pressurizing step or the rinsing step (time during which the filtering step is not conducted) can be reduced.

The ballast water treatment system of the present embodiment includes a filtering unit having a filter; a raw water passage for supplying raw water to the filtering unit, the raw water passage being provided with a first switching valve; a filtered water passage for sending filtered water produced in the filtering unit to a ballast tank, the filtered water passage being provided with a second switching valve; a discharge passage for discharging water from the filtering unit, the discharge passage being provided with a third switching valve; a gas passage for supplying gas to the filtering unit, the gas passage being provided with a fourth switching valve; and a controller for controlling the first to fourth switching valves. The controller is configured to, after filtering of the raw water is conducted by the filtering unit and before the filter is rinsed, control the first switching valve, the third switching valve, and the fourth switching valve to be closed and the second switching valve to be opened, and control the first switching valve, the second switching valve, and the third switching valve to be closed and the fourth switching valve to be opened.

In the present embodiment, after filtering of raw water is conducted by the filtering unit (i.e., the filtering step) and before the filter is rinsed (i.e., the rinsing step), control to bring the first switching valve, the third switching valve, and the fourth switching valve to be closed and the second switching valve to be opened (i.e., the volume-increasing step), and control to bring the first switching valve, the second switching valve, and the third switching valve to be closed, and the fourth switching valve to be opened (pressurizing step) are conducted. Accordingly, the present embodiment enables the rinsing effect in the rinsing step to be increased, thereby increasing rinsing efficiency.

In the ballast water treatment system, after filtering of the raw water is conducted by the filtering unit and before the filter is rinsed, the controller is preferably configured to control the first switching valve and the fourth switching valve to be closed and the second switching valve and the third switching valve to be opened.

In this configuration, after filtering of the raw water is conducted by the filtering unit (i.e., the filtering step) and before the filter is rinsed (i.e., the rinsing step), control is conducted such that the first switching valve and the fourth switching valve are closed and the second switching valve and the third switching valve are opened (i.e., the volume-reduction step). In this configuration, the volume of the water present in the space on the primary side of the housing is reduced by the volume-reduction step before the rinsing step. Thus, it is possible to increase in advance a space (void) in which no water is present on the primary side of the housing before the rinsing step. Accordingly, in the subsequent rinsing step, a fluid is more likely to pass forcefully through the filter from the secondary side to the primary side. This enables a further increase in the effect of removing foreign matters from the filter, thereby further improving the rinsing effect.

The invention claimed is:

1. A ballast water production method using a filtering unit having a housing and a filter housed in the housing, the method comprising:
   (i) passing raw water supplied into the housing through the filter from a primary side that is upstream of the filter to a secondary side that is downstream of the filter;
   (ii) subsequently flowing back a filtered water remaining in a filtered water passage into the secondary side of the housing, thereby increasing a volume of water present in a space of the secondary side in the housing while a supply of the raw water into the housing is stopped, the filtered water passage being a passage for sending the filtered water produced in the filtering unit to a ballast tank;
   (iii) subsequently pressurizing an inside of the housing from the secondary side while the supply of the raw water into the housing is stopped; and
   (iv) subsequently passing a fluid through the filter from the secondary side to the primary side while the supply of the raw water into the housing is stopped.

2. The ballast water production method according to claim 1, further comprising:
   (v) reducing a volume of water present in a space on the primary side of the housing after the passing (i) and before the passing (iv).

3. The ballast water production method according to claim 1, wherein the pressurizing (iii) and the passing (iv) are conducted a plurality of times between the passing (i) and a subsequent passing (i).

4. The ballast water production method according to claim 1, wherein:
   a plurality of the filtering units are provided; and
   when the pressurizing (iii) or the passing (iv) is conducted using any of the filtering units, the passing (i) is conducted using other filtering units.

5. A ballast water treatment system, comprising:
a filtering unit having a housing and a filter housed in the housing;
a raw water passage for supplying raw water to a primary side in the housing of the filtering unit, said primary side being located upstream of the filter in the housing, the raw water passage being provided with a first switching valve and a pump;
a filtered water passage for sending filtered water produced in the filtering unit from a secondary side in the housing to a ballast tank, the secondary side being located downstream of the filter in the housing, and the filtered water passage being provided with a second switching valve;
a discharge passage for discharging water from a secondary side of the filtering unit, said secondary side being located downstream of the filter, the discharge passage being provided with a third switching valve;
a gas passage for supplying gas to the secondary side in the housing of the filtering unit, the gas passage being provided with a fourth switching valve; and
a controller for controlling the first to fourth switching valves,
wherein the controller is configured to:
conduct a first control of the first switching valve and the second switching valve to be opened and the third switching valve and the fourth switching valve to be closed, and the pump to be driven to filter the raw water by the filtering unit,
conduct a second control of the first switching valve and the second switching valve to be closed and the third switching valve and the fourth switching valve to be opened, and the pump to be stopped to rinse the filter,
control, after the first control and before the second control, the first switching valve, the third switching valve, and the fourth switching valve to be closed and the second switching valve to be opened, and the pump to be stopped, thereby flowing back the filtered water remaining in the filtered water passage into the secondary side in the housing, and
control, after the first control and before the second control, the first switching valve, the second switching valve, and the third switching valve to be closed and the fourth switching valve to be opened, and the pump to be stopped.

6. The ballast water treatment system according to claim 5, wherein the controller is configured to, after the first control and before the second control, control the first switching valve and the fourth switching valve to be closed and the second switching valve and the third switching valve to be opened.

* * * * *